US008161321B2

(12) United States Patent
Zheng et al.

(10) Patent No.: US 8,161,321 B2
(45) Date of Patent: Apr. 17, 2012

(54) VIRTUAL MACHINE-BASED ON-DEMAND PARALLEL DISASTER RECOVERY SYSTEM AND THE METHOD THEREOF

(76) Inventors: Weimin Zheng, Beijing (CN); Hongliang Yu, Beijing (CN)

( * ) Notice: Subject to any disclaimer, the term of this patent is extended or adjusted under 35 U.S.C. 154(b) by 373 days.

(21) Appl. No.: 12/490,832

(22) Filed: Jun. 24, 2009

(65) Prior Publication Data

US 2010/0115332 A1    May 6, 2010

(30) Foreign Application Priority Data

Nov. 6, 2008    (CN) .......................... 2008 1 0225919

(51) Int. Cl.
G06F 11/00    (2006.01)
(52) U.S. Cl. .......................... 714/15; 707/674; 711/162
(58) Field of Classification Search ...................... 714/15; 711/162; 707/674
See application file for complete search history.

(56) References Cited

U.S. PATENT DOCUMENTS

| | | | | |
|---|---|---|---|---|
| 6,647,473 | B1 * | 11/2003 | Golds et al. ................... | 711/161 |
| 7,296,182 | B2 * | 11/2007 | Greenspan et al. ............. | 714/13 |
| 7,318,135 | B1 * | 1/2008 | Tormasov et al. ............. | 711/162 |
| 7,356,679 | B1 * | 4/2008 | Le et al. .......................... | 713/1 |
| 7,533,229 | B1 * | 5/2009 | van Rietschote ............. | 711/161 |
| 7,552,358 | B1 * | 6/2009 | Asgar-Deen et al. .......... | 714/6.1 |
| 7,565,495 | B2 * | 7/2009 | Kleinschnitz et al. ........ | 711/154 |
| 7,634,679 | B2 * | 12/2009 | Quintiliano .................. | 714/4.11 |
| 7,793,148 | B2 * | 9/2010 | Beardsley et al. ............. | 714/13 |
| 2003/0191911 | A1 * | 10/2003 | Kleinschnitz et al. ........ | 711/154 |
| 2004/0236803 | A1 * | 11/2004 | De Spiegeleer ............... | 707/204 |
| 2005/0010924 | A1 * | 1/2005 | Hipp et al. ................... | 718/104 |
| 2005/0195660 | A1 * | 9/2005 | Kavuri et al. ............ | 365/189.05 |
| 2005/0237943 | A1 * | 10/2005 | Sasagawa ...................... | 370/242 |
| 2006/0074943 | A1 * | 4/2006 | Nakano et al. ................ | 707/100 |
| 2006/0095706 | A1 * | 5/2006 | Aoyama ........................ | 711/171 |
| 2006/0123208 | A1 * | 6/2006 | Johnson ........................ | 711/162 |
| 2006/0149714 | A1 * | 7/2006 | Fellenstein et al. ............... | 707/3 |
| 2007/0088980 | A1 * | 4/2007 | Greenspan et al. ............. | 714/13 |
| 2008/0034021 | A1 * | 2/2008 | De Spiegeleer ............... | 707/204 |

OTHER PUBLICATIONS

Proceedings of the FAST 2002 Conference on File and Storage Technologies, USENIX Association, Monterey, California, USA, Jan. 28-30, 2002.

(Continued)

*Primary Examiner* — Scott Baderman
*Assistant Examiner* — Loan L. T. Truong (57) ABSTRACT

Embodiments disclosed herein related to a virtual machine-based on-demand parallel disaster recovery system and a method thereof. By integrating context of processes of virtual machine, the system and method build a process tree related to applications and support the operation of freezing the context and intercept memory image consistent with the virtual machine environment, based on which, a method for on-demand parallel recovery is provided. In the method, while monitoring file system data that processes of virtual machine are to visit by a kernel intercept unit, recovery of related data blocks of the applications is conducted in the background in order to make applications and recovery procedure of the virtual machine run simultaneously. The recovery procedure is divided into two phases, recovering memory image first and then recovering file system or volume data. Through the procedure, applications can be recovered precisely to the running state when they are backup. The method realizes the scheduling of multiple backup tasks and recovery tasks in client and realizes the prefetching of the recovered data. The embodiments described herein consume less time for recovery, enhances the reliability of the protected applications, has a low cost and practical value; and it is transparent to users.

15 Claims, 6 Drawing Sheets

OTHER PUBLICATIONS

Proceedings of the 5th Symposium on Operating Systems Design and Implementation, USENIX Association, Boston, Massachusettes, USA, Dec. 9-11, 2002.

Cully, Brenden et al., Remus: High Availability via Asynchronous Virtual Machine Replication, NSDI '08: 5th USENIX Symposium on Networked Systems and Design and Implementation, Apr. 2008.

Ta-Shma, Paula et al., Virtual Machine Time Travel Using Continuous Data Protection and Checkpointing, ACM SIGOPS Operating Systems Review, vol. 42, Issue 1, Jan. 2008.

Chervenak, Ann et al., Protecting File Systems: A Survey of Backup Techniques, Joint NASA and IEEE Mass Storage Conference, 1998.

Laadan, Oren and Nieh, Jason, Transparent Checkpoint-Restart of Multiple Processes on Commodity Operating Systems, USENIX Association, 2007 USENIX Annual Technical Conference, 2007.

Bradford, Robert et al., Live Wide-Area Migration of Virtual Machines Including Local Persistent State, ACM/Usenix International Conference on Virtual Execution Environments, Jun. 13-15, 2007.

Milojicic et al., Process Migration, ACM Computing Surveys, vol. 32, Issue 3, Sep. 2000.

Huang, W. et al., Nomad: Migrating OS-bypass Networks in Virtual Machines, 3rd International ACM SIGPLAN/SIGOPS Conference on Virtual Execution Environments (VEE'07), San Diego, CA, Jun. 2007.

Osman, Steven et al., The Design and Implementation of Zap: A System for Migrating Computing Environments, Proceedings of the 5th Operating Systems Design and Implementation (OSDI 2002), Boston, Massechusettes, Dec. 2002.

Laadan, Oren et al., Transparent Checkpoint-Restart of Distributed Applications on Commodity Clusters, Proceedings of the 2005 IEEE International Conference on Cluster Computing (Cluster 2005), Boston, Massachussetes, Sep. 26-30, 2005.

Soltesz, Stephen et al., Container-based Operating System Virtualization: A Scalable, High-performance Alternative to Hypervisors, Mar. 2007.

Co-pending U.S. Appl. No. 12/490,817 entitled "System for Disaster Recovery Backup and a Method Thereof", to Zheng et al., filed Jun. 24, 2009.

* cited by examiner

VIRTUAL MACHINE-BASED ON-DEMAND PARALLEL DISASTER RECOVERY SYSTEM AND THE METHOD THEREOF

BACKGROUND OF INVENTION

1. Field of the Invention

The present invention relates to the field of operation system and network storage, and in particular to a virtual machine-based on-demand parallel disaster recovery system and the method thereof.

2. Description of the Relevant Art

Disaster recovery technology can ensure security of data and running of critical businesses without interruption under circumstances of various natural disasters and vandalism in order to create a system with high reliability. According to the positions where data is copied and runs, the current disaster recovery system is divided into the following types: disaster recovery systems based on storage device (storage-based), which is based on special physical storage device, such as MirrorView running on EMC Clariion arrays and SRDF on Symmetrix storage arrays, PPRC of IBM company, and True-Copy of Hitachi company; disaster recovery systems based on host operation system software (host-based), such as Veritas Volume Replicator (VVR) of Symantec company, which achieves the aim of disaster recovery by copying volume group RVG, and the similar products such as volume shadow copy of Microsoft company; disaster recovery systems based on storage switch (SAN-Based) which realizes backup of data at the storage switching devices, such as SANTap of Cisco and IPStor of FalconStor; disaster recovery systems based on database/applications such as DataGuard of Oracle and remote Q copy of DB2 and so on, which are realized by scanning and recording database log using the copy technology operated on data logic. The advantages of disaster recovery systems based on database/applications include low cost etc, however these systems have strong dependency on database and applications. To sum up, each one of the above present systems has all or part of the following disadvantages: it cannot reserve the running state of applications and can only realize replication on data-level; it depends on special device, so it has a high cost and a small scope of application; it depends on special applications; it takes a long time to copy and to recover data and it wastes much time at the stop state of services.

SUMMARY OF THE INVENTION

In one embodiment, a virtual machine-based on-demand parallel disaster recovery system and a method thereof is described. The system, as instant disaster recovery system, does not depend on physical devices and it can protect any applications.

One embodiment includes:

a virtual machine-based on-demand disaster recovery system for recovery includes a disaster recovery center and a client connected to each other; the disaster recovery center is made of multiple servers to compose a storage sharing cluster. The disaster recovery center includes:

a disaster recovery service guard unit which is responsible for monitoring ports and receiving backup or recovering requests from the client and correspondingly for replicating or recovering the data;

a backup data management unit used to generate and store corresponding memory image volumes and data image volumes in response to backup requests from the client;

a cluster volume management unit which virtualizes a sharing storage pool for all the nodes to use and stores and manages memory image volumes and data image volumes in a storage pool in form of logic volume;

an index file management unit used to search and locate the memory image volumes and data image volumes in the storage pool;

the client includes:

a virtual machine environment building unit used to build an independent process group and sessions in a host system of the client and to encapsule applications and relevant resources needed protection by users and then to build the virtual machine environment where processes of the client are located;

a kernel interception unit used to monitor each read-write request in the virtual machine environment and to search and maintain a recovery data bitmap that records the information related to the recovered data;

a virtual machine freezing unit used to freeze the virtual machine environment. It firstly searches the recovery data bitmap when the kernel interception unit has monitored that there are read-write requests of processes of the virtual machine environment; Secondly, if the data to be read and written is not recovered, the operation of freezing the virtual machine environment is initiated in kernel space;

a virtual machine unfreezing unit used to initiate the operation of unfreezing the virtual machine after the data to be read and written is written into the local storage media in the client in order to make each process in the virtual machine environment resume operation;

a request forward guard unit used to communicate with the disaster recovery center, to initiate backup or recover request, send and receive data and to centrally complete data request management and scheduling to realize the disaster recovery.

Wherein, the request forward guard unit in the client of the system includes a backup subunit and a recovery subunit, wherein the backup subunit is used to receive backup request sent from users, to generate backup task, to establish a connection with the disaster recovery center according to the need of backup task, to forward the subsequent requests of the backup task to the servers and to centrally schedule the backup requests and control flow according to the priority of each backup task.

The recovery subunit is used to receive the recover requests sent from users and the kernel interception unit, to generate recovery task, to establish a connection with the disaster recovery center according to the need of the recovery task, to record the data sent from disaster recovery center and write them into the local storage media, to execute callback function to complete data recovery in response to the recover requests from the kernel interception unit, and to centrally schedule the recover requests and control flow according to the priority of each recovery task.

Wherein, the disaster recovery center in the system further includes a cluster volume guard unit communicating with the cluster volume management unit, the cluster volume guard unit is used to maintain the state of the sharing storage cluster, to ensure the number of effective nodes in the sharing cluster, and to synchronize the modification made to the memory image volumes and data image volumes in the storage pool.

Wherein, the disaster recovery center in the system further includes a cluster volume drive unit and a physical device drive unit. The cluster volume drive unit is used to maintain the mapping information of logic data blocks and physical data blocks of the memory image volumes and data image volumes, and to schedule and distribute the read-write orders of each logic volume. The layer under the cluster volume drive unit is a physical device drive unit connecting to the sharing storage pool through the storage area network.

In another embodiment a virtual machine-based on-demand parallel disaster recovery method is implemented by using the above-mentioned system. The method includes:

s1.0, creating the virtual machine environment in the client and containing the protected applications in the virtual machine environment;

s1.1, generating the memory image volumes and data image volumes of the virtual machine environment at the designated time point according to the backup request of the client and completing the backup of data;

s1.2, the client initiates the recovery procedure, generates recovery tasks according to recover requests that users initiate and sends recover requests to the disaster recovery center, and simultaneously informs the kernel interception unit of initializing the recovery data bitmap;

s1.3, the disaster recovery center searches and locates the memory image volumes of the virtual machine environment at the designated time point according to the recover request and sends the memory image volumes to the client;

s1.4, the client captures the memory image of the virtual machine environment at the designated time point according to the received memory image volumes, then rebuilds the memory image to recover the normal running state of the virtual machine environment at the designated time point, and executes step s1.5 and step s1.5' simultaneously;

s1.5, opening the intercepting function of read-write request of the kernel generic block device in the client; searching the recovery data bitmap firstly when processes in the virtual machine environment visit the file system; if data to be read and written has been recovered, inviting the file system directly, otherwise executing step s1.6;

s1.6, the client initiates the operation of freezing the virtual machine environment; the kernel interception unit issues the recover requests of the read-write data;

s1.7, hanging the recover requests in step s1.6 in the array of the recovery tasks built in step s1.2 and endowing the recover requests with the highest priority and then waiting for the responses from the disaster recovery center;

s1.8, after receiving the read-write data from the disaster recovery center, the client renews the recovery data bitmap by marking the read-write data as "recovered" and then writes the marked data into the local storage media;

s1.9, unfreezing the virtual machine to make the processes in the virtual machine environment resume operation;

s1.5', according to the recovery task established in step s1.2, the client continuously sends data block recover requests to the disaster recovery center for the recovery of data blocks in the background; during recovering, the client avoids to repeat recovering data through searching the recovery data bitmap.

Wherein, rebuilding the memory image to recover the normal running state of the virtual machine environment at the designated time point conducted in step s1.4 of the method includes:

s1.4a, deriving a kernel process according to the process trees in the memory image, modifying the kernel stack of the kernel processes to switch the kernel processes to the default self-recovering processes when the system call withdraws;

s1.4b, the kernel processes derive their sub-processes according to the process tree in the memory image; the said sub-processes are self-recovering processes; modifying the kernel stack again to construct the withdrawal of the second system call and then switching the kernel processes to the root processes of user state at the designated time point;

s1.4c, deriving new sub-processes in sequence from root to leaves according to the structure of the process tree in the memory image until all the processes in the memory image are derived; and then setting the state of each derived process as deep-sleep state;

s1.4d, starting another independent process located outside the virtual machine environment in the client; according to the orders of users, the independent process resets the state of all the processes in the virtual machine environment in accordance with the records in the memory image to recover the normal running state of the virtual machine environment at the designated time point.

Wherein, step s1.0 of building the virtual machine environment in the method includes:

s1.0a, extending the structure of the processes in the kernel of operation system in the client add the domain standing for the context of the processes of virtual machine where the processes are located to the structure;

s1.0b, starting a process of user state to complete the switch between input device and output device and then entering into the kernel state through a system call;

s1.0c, switching the said processes of user state to the user space and executing/sbin/init in the context of the virtual machine to make the processes of user state become the root processes of the virtual machine environment, then deriving related sub-processes and building related system services;

s1.0d, building the switching mechanism between the context of processes in the local operation system and that of processes of the virtual machine to construct the virtual machine environment.

Wherein, after issuing the recover request of read-write data in step s1.6, the method includes selecting the prefetched data to prefetch by way of submitting the recover request of each data block close to the physical position of the read-write data. Wherein, the physical position is determined by the stated address offset threshold.

Wherein, the said address offset threshold is a dynamically optimal value-tuning function. The way of tuning is: when the prefetched data is what the files, which the processes in the virtual machine environment need to visit, need, the absolute value of the said address offset threshold is increased, otherwise it is reduced.

Wherein, the priority of the recover request of the prefetched data is lower than that of the read-write data in step s1.6, but higher than that of data blocks sent by the background in step s1.5.

Wherein, in step s1.5', according to the pre-set recovery strategy, the background continuously sends the recover requests of data blocks to the disaster recovery center to recover data blocks. The said recovery strategy is: sending the recover requests of data blocks in sequence of the sensitivity level and sending data blocks with high sensitivity level first. The said sensitivity level is set in data blocks. The said sensitivity level is obtained through counting the times of reading and writing of each data block in time window with a fixed size.

Wherein, step s1.8 further includes the step of compressing the bitmap by the way of tour code compression after renewing the bitmap.

Wherein, in step s1.8, read-write lock mechanism is selected when renewing bitmap. The old data is not deleted when renewing data by the operation of writing until all the read-visits conducted by the old data end. During the process, the operation of reading that newly occurs is located to new data.

Wherein, in step s1.2, the client turns each recover request to a two-way link list through link of points, then builds a recover request hash list in memory and puts each recover request into each corresponding hash bucket according to its request number.

Wherein, in step s1.8 and s1.5, after receiving the recovered data from the disaster recovery center, the client writes the data into the bitmap first and then informs the subsequent procedures that the data has been received. If the data fails to be written, the received data will be reserved and be rewritten until the data is written successfully.

The virtual machine-based on-demand parallel disaster recovery system for recovery and the method thereof may bring the following beneficial effects:

1) it is enable to capture the important data sets first according to applications through recovering and running applications simultaneously and to execute the complete data recovery in the background according to a certain strategy, which achieves instant service rebuilding.

2) All the memory image of applications can be reserved and the consistency of that can be maintained. Applications and services can be recovered to the running state at the time when they are backupped.

3) Through building an independent context of the processes in the virtual machine, the dependency between processes inside and outside the environment can be reduced and the correctness and independency of recovery can be ensured.

4) As an agent, the request forward guard process can manage centrally the backup and recovery tasks of the client, control the network flow, and schedule the priority of installing requests of data blocks.

5) Servers can support different modes, such as full backup and incremental backup, and strengthen the management of the backup data by building an index, through which achieve the aim of being transparent to the recovered applications and only providing an unified read-write interface in line with the meaning of Posix.

BRIEF DESCRIPTION OF THE DRAWINGS

Advantages of the present invention will become apparent to those skilled in the art with the benefit of the following detailed description of embodiments and upon reference to the accompanying drawings in which.

Wherein in the figures: 1. client; 2. server cluster; 3. SAN sharing storage target device; 4. wide area network; 5. fiber/Ethernet switch; 6. physical storage devices.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

The embodiments described herein provide a virtual machine-based on-demand parallel disaster recovery system and the method thereof. Hereafter the embodiments will be described with reference to the figures.

The virtual machine-based on-demand parallel disaster recovery system and the method thereof do not depend on specific devices and applications firstly. Secondly, the embodiments integrate the context of processes of the virtual machine in the client and it can build a process tree related to applications and support the operation of freezing the context and intercept memory image consistent with the virtual machine environment. The on-demand parallel recovery based on the above-mentioned technology is divided into two phases, there are recovering memory image first and then recovering file system or volume data. Applications can be recovered to the running state when they are backup by the recovery steps. The embodiments support the simultaneous operation of recovering and running processes to provide instant services. Finally, the embodiments support the scheduling of multiple backup tasks and recovery tasks in client and the prefetching of the recovery data. The embodiments consume less time for recovery, enhances the reliability of the protected applications, has a low cost and practical value; and it is realized by pure software and is transparent to users.

Figure 1:
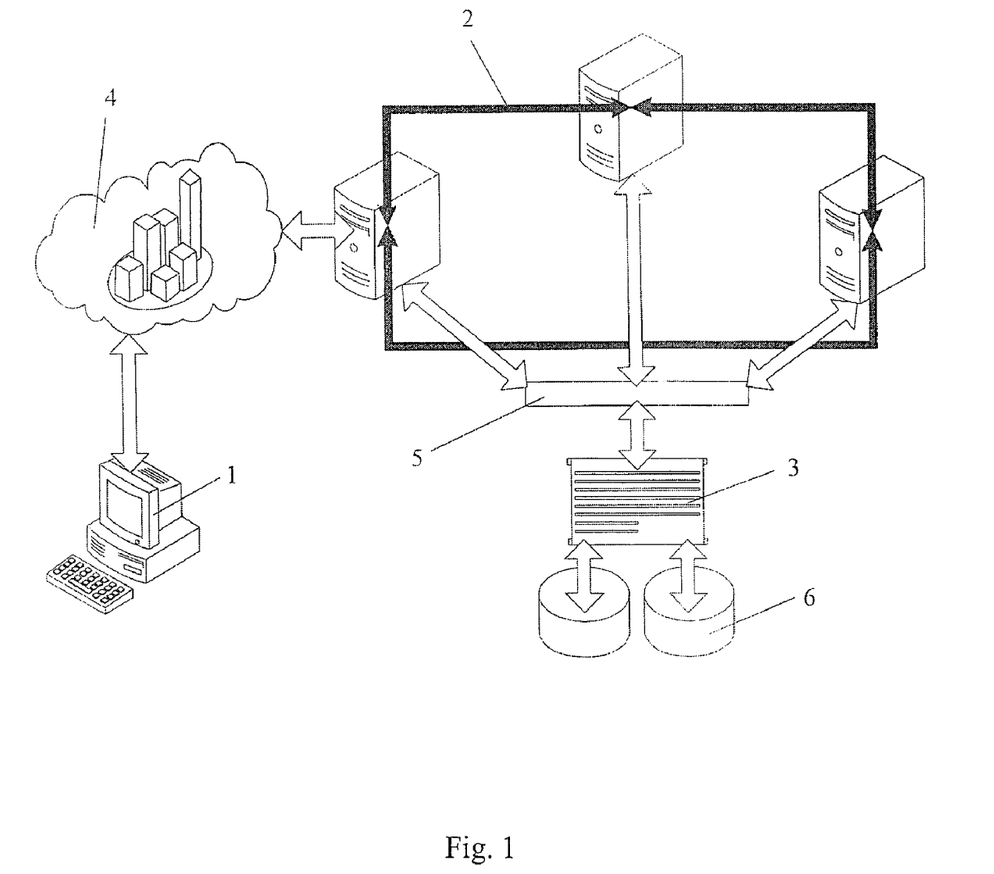
FIG. 1 illustrates the structure diagram of the virtual machine-based on-demand parallel disaster recovery system.

The main structure of the virtual machine-based on-demand parallel disaster recovery system in the present example is shown in FIG. 1. The structure includes client 1 that applies disaster recovery services and a disaster recovery center that provides disaster recovery services. The disaster recovery center is composed of server cluster 2 of sharing SAN (Storage Area Network) sharing storage target device 3. Wherein, client 1 is connected to server cluster 2 through wide area network 4; server cluster 2 is connected to SAN sharing storage target device 3 through fiber/Ethernet switch 5; SAN sharing storage target device 3 connects with a physical storage device 6; each server node can visit the whole storage space and provide the same service; a broken server node can be replaced by another node or a new node, which reflects good availability. The SAN sharing storage target device 3 is the basic unit composing the sharing storage pool; and it makes physical storage device 6 be shared in network through the target device software running on the SAN sharing storage target device 3; wherein, the head of physical storage device 6 preserves the metadata of the virtual storage pool; each storage device is designated with a global unique identification; and the distribution of the data in physical storage device 6 is charged by the undermentioned cluster volume management unit. As a network connection device, the said fiber/Ethernet switch 5, is used to forward the orders coming from server cluster 2. The orders are visited through SCSI data of the small computer system interfaces enfolded with FC (Fiber Channel) or TCP/IP protocol. The said server cluster 2 and SAN sharing storage target device 3 are connected to fiber/Ethernet switch 5 through fiber bus adapters or Ethernet network card.

Figure 2:
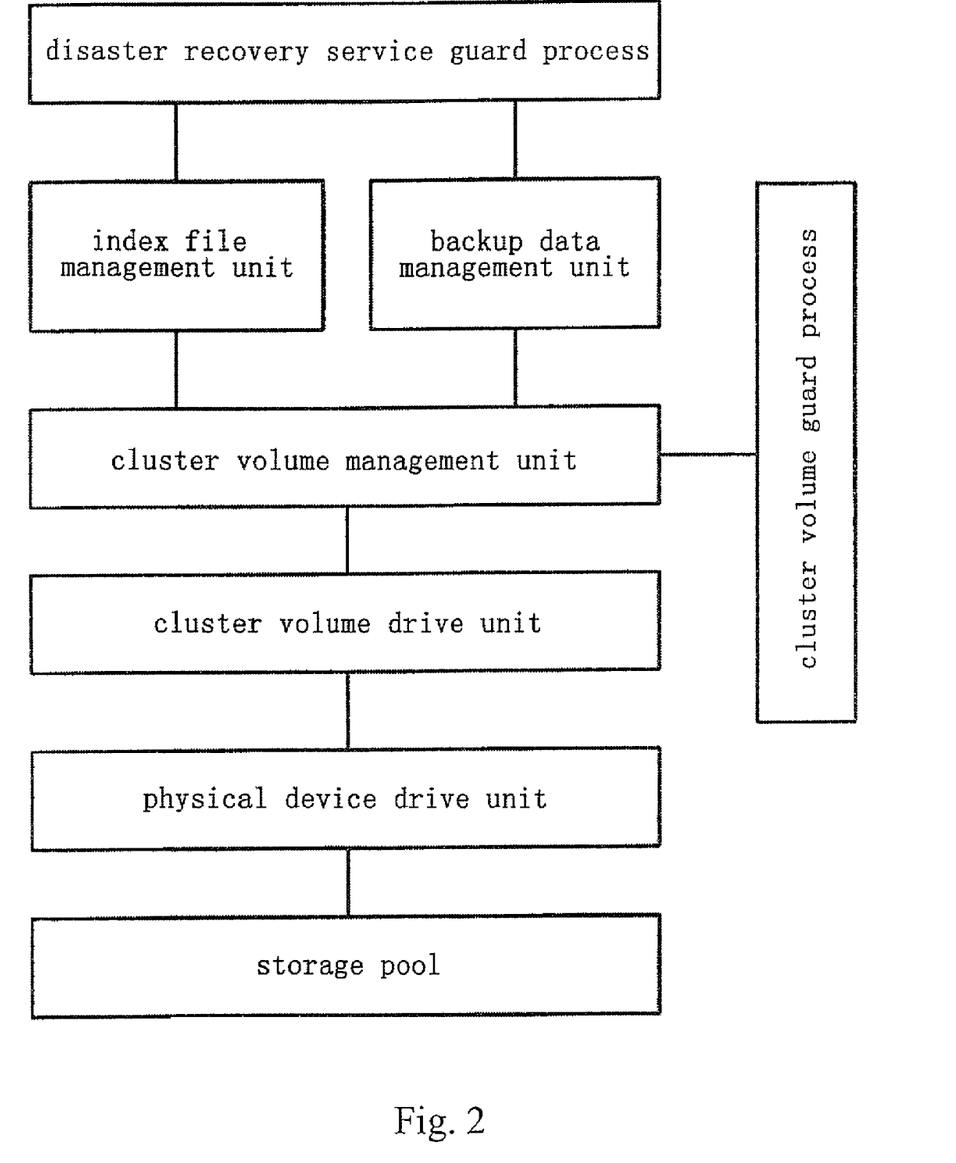
FIG. 2 illustrates the structure diagram of the disaster recovery center.

Disaster recovery service is provided by the nodes of disaster recovery center 2 and the disaster recovery center is shown in FIG. 2. The disaster recovery center of the present example includes:

Disaster recovery service guard process 01, responsible for monitoring ports, receiving disaster recover request from the client and responding with different processing ways according to different requests. During processes of backup and recovery, it analyzes backup request or recover request and transforms these requests to write-in or read-out orders identified by backup data management unit 02; and then it generates, maintains and searches the relationship between memory image and file system data image in index files;

Backup data management unit 02, responsible for initiating the request of generating corresponding memory image volumes and data image volumes to its lower mechanism for each backup request of users, for managing the different logic volumes in users space, and for establishing indexes with high speed in memory for the searching of backup conducted at different clients and different time points. For example, it establishes an hash index standing for the data structure of each volume, records data related to system, such as composition information, properties and ID of virtual volumes, and provides interfaces for operations such as locating and searching, building, deleting and expanding to each volume;

Index file management unit 03, responsible for generating and maintaining the index XML files of memory image volumes and data image volumes and for preserving the index XML files in the file system of the disaster recovery center in the process of backup. During recovery, it reads and analyzes the index XML files during starting servers and establishes history backup databases used to store the mapping relation between request time and volume ID and to generate indexes with high-speed in order to respond to the data requests of applications rapidly; thus this unit only establishes the mapping relation between request time and volume ID.

The relation between the backup data management unit 02 and the index file management unit 03 is as follows: during recovery, the index file management unit 03 executes first and then the backup data management unit 02 executes; the index file management unit 03 locates the ID of logic volumes through time to complete the mapping from user layer to system layer; and then the backup data management unit 02 searches the data structure of its representative volume through ID and the property information of the volume, which is only related to system layer.

Cluster volume management unit 04, responsible for virtualizing a sharing storage pool for the use of all nodes and for preservation and management of the corresponding memory image volumes and data image volumes generated by backup data management unit 02. The concrete steps of preservation and management are as follows: completing the load of masses of metadata in the sharing storage pool, establishing the dependency relationship between full backup virtual volumes and increment backup virtual volumes by analyzing the metadata, and completing the arranging of the rapid index structure of each memory image backup virtual volume, full backup virtual volume and increment backup virtual volume. At the same time, the unit provides the upper layer with an unified read-write interface in line with the meaning of Posix in order to send property change information of volumes to the kernel drive and it is responsible for communicating with cluster volume guard process 07 to inform the changes of volumes.

Cluster volume drive unit 05, responsible for maintenance of the mapping information of the logic data blocks and physical data blocks of the corresponding memory image volumes and data image volumes generated by backup data management unit 02, and the scheduling and distribution of read-write orders of each logic volume; the lower layer thereof is physical device drive unit 06.

Physical device drive unit 06 is connected to a storage pool through the storage area network (SAN).

Cluster volume guard process 07, communicating with cluster volume management unit 04 and responsible for the maintenance of the state of the server cluster and for ensuring the number of effective nodes in the cluster and the synchronization of the modification made to the sharing volumes in the storage pool.

The cooperative processing of disaster recovery service guard process 01 and backup data management unit 02 to the backup request and recover request is as follows respectively:

For the backup request, disaster recovery service guard process 01 and backup data management unit 02 conduct different processing firstly according to its request types, that is full backup, increment backup and memory image backup. For increment backup, full backup virtual volumes need to be generated, that is preserving full data image of client system at a certain time point as the form of logic volume and then writing the virtual volumes in sequence; for increment backup, increment backup virtual volumes need to be generated, that is only to record the little data change since the latest backup and to write increment data and establish the mapping relation among the positions of the data, wherein the positions of the data in the increment volumes corresponds with that in the backup volumes; for memory mapping backup, memory image backup virtual volumes need to be generated, that is storing memory image of system at a certain time point as the form of logic volume.

For the recover request, the specific virtual volumes in the storage pool are located according to the information such as type, time point and position of the data requested to recover in the recover request, and then an unified read-write interface in line with the meaning of Posix is provided through cluster volume management unit 04 to visit the volumes and the designated data blocks are read or written.

Figure 3:
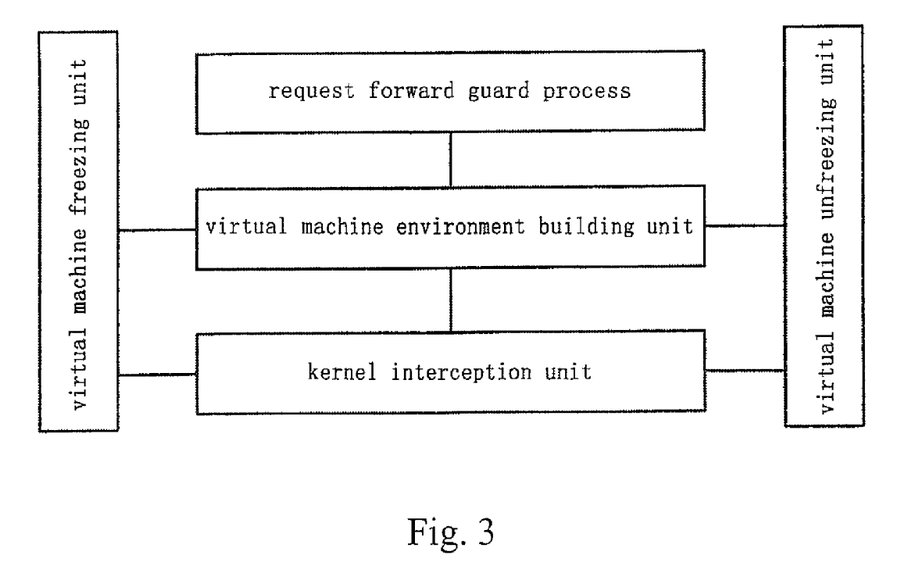
FIG. 3 illustrates the structure diagram of the client.

Client 1 is any to-be-protected computer. The client needs to issue disaster recovery application to disaster recovery center 2 and to inform about related parameters, such as capacity and type of backup. The original system of client 1 needs no modification. A host system and its corresponding software environment are built in client 1 and the to-be-protected user system is contained in a virtual environment; the stricture of each unit in the client thereof is shown in FIG. 3. Client 1 mainly includes:

A virtual machine environment building unit 21, responsible for encapsuling applications and corresponding resources that users need to protect by building independent process groups and sessions in a host system of a client, building the virtual machine environment and providing virtual terminals and interfaces to ensure normal use for users. At the same time, the virtual machine environment supports the freezing and transmitting of the memory image of its inside processes, which is the base of realizing the disaster recovery independent on separating applications.

A kernel interception unit 22, used to monitor each read-write request in the virtual machine environment, to search and maintain the recovery data bitmap that records the data recovery information. The kernel interception unit 22 is loaded on the generic block device drive layer in the kernel. The recovery data bitmap is stored in the kernel space.

A virtual machine freezing unit 23, used to search recovery data bitmap when the kernel interception unit 22 monitors read-write requests of processes of the virtual machine environment. If the data that needs to read and write is not recovered, the operation of freezing the virtual machine environment is initiated in core state.

A virtual machine unfreezing unit 24, used to initiate the operation of unfreezing the virtual machine after the kernel interception unit 22 detected that the data needs to read and write is written into local storage media in order to make each process in the virtual machine environment recover its operation;

A request forward guard process 25 communicating with the disaster recovery center 2, used to issue backup or recover requests, to send and receive data and to centrally manage and schedule the data request to realize the disaster recovery. In the example, the request forward guard process receives the local backup or recover requests through opening a local monitoring port. When a request arrives, the request forward guard process establishes a connection first and then puts the request into the array of backup task or that of recovery task; at the same time, the monitoring port is responsible for monitoring the data block recover request from the kernel interception unit 22.

In the example, the request forward guard process 25 includes a backup sub-process 251 and an recovery sub-process 252, wherein:

The backup sub-process 251 is used to receive backup requests sent by users, to generate backup task, to establish a connection with disaster recovery center 2 according to the need of each backup task by going through the array of backup task, to forward the subsequent requests of the backup task to servers, and to centrally schedule and control the flow of the backup requests according to the priority of each backup task.

The recovery sub-process 252 is used to receive the recover requests sent from users, to generate recovery task, to establish a connection with disaster recovery center 2 according to the need of each recovery task by going through the array of recovery task, to receive data block recover request sent from local connection sponsor and the kernel interception unit and maintain it in the array of the data block recover request, to record the data sent from the server and write the data into local storage media, to execute callback function to complete data recovery in response to the recover requests from the kernel interception unit simultaneously, and to centrally schedule and control the flow of the recover requests according to the priority of each recovery task.

Figure 4:
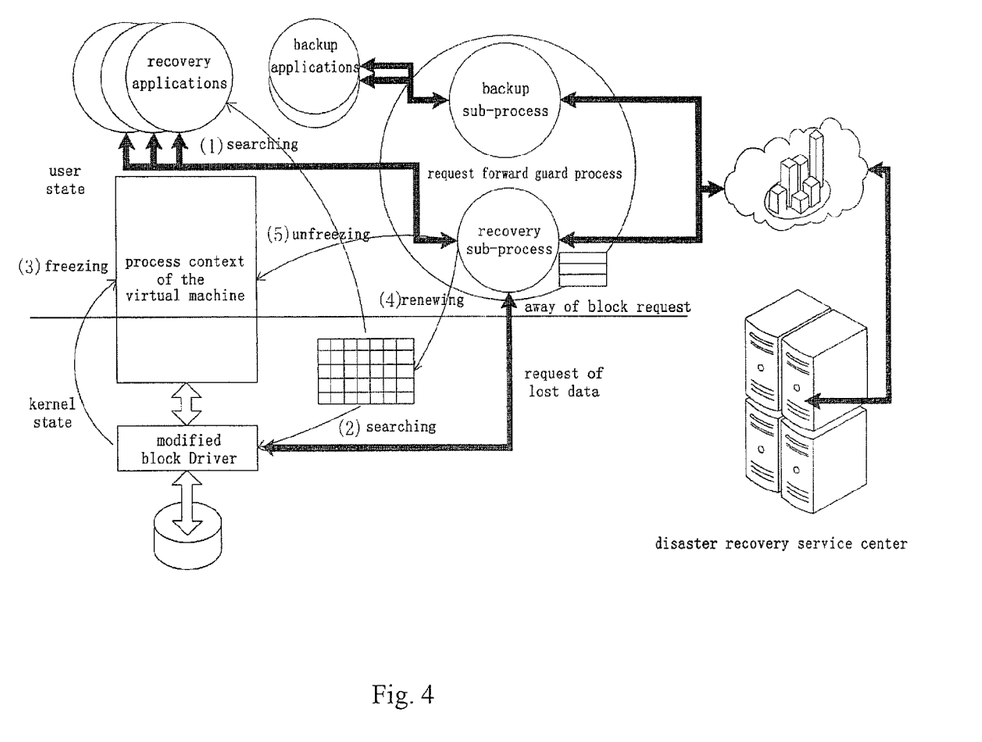
FIG. 4 depicts a schematic diagram of the request forward guard process.

In realization, request forward guard process 25 uses the program structure with a big cycle as shown in FIG. 4. When no event happens, the whole process stays in the monitor obstruction state; and all the interfaces form a resource pool including the port waiting connections, the input port of the data of backup task, the reception port of the recovery data of recovery task and so on. Once an event such as writing data or recovering an application happens, the process scans each port and then processes the happening event. The requests of making the backup of applications and recovering applications are initiated by users, which can be multiple respectively and each corresponds with a backup or a data recovery. For the same virtual machine, only one task exists at one moment; the backup task submits the data blocks to make a backup in sequence to the request forward guard process. The recovery task submits the data block recover request according to a certain recovery strategy. The recovery data bitmap are searched to avoid repeated submission.

Figure 5A:
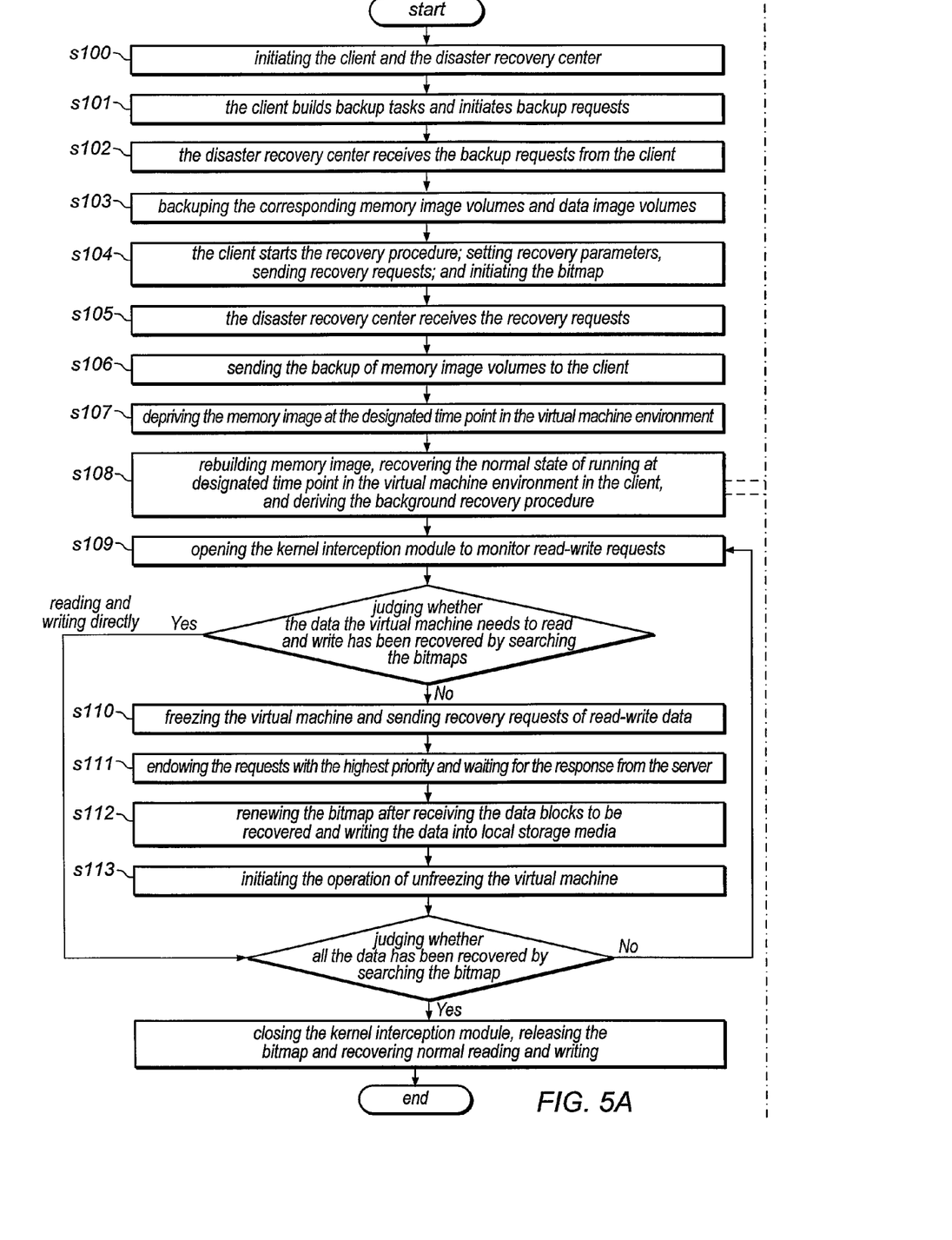
FIG. 5A-5B illustrate the flow chart of the virtual machine-based on-demand parallel disaster recovery method.
Figure 5B:
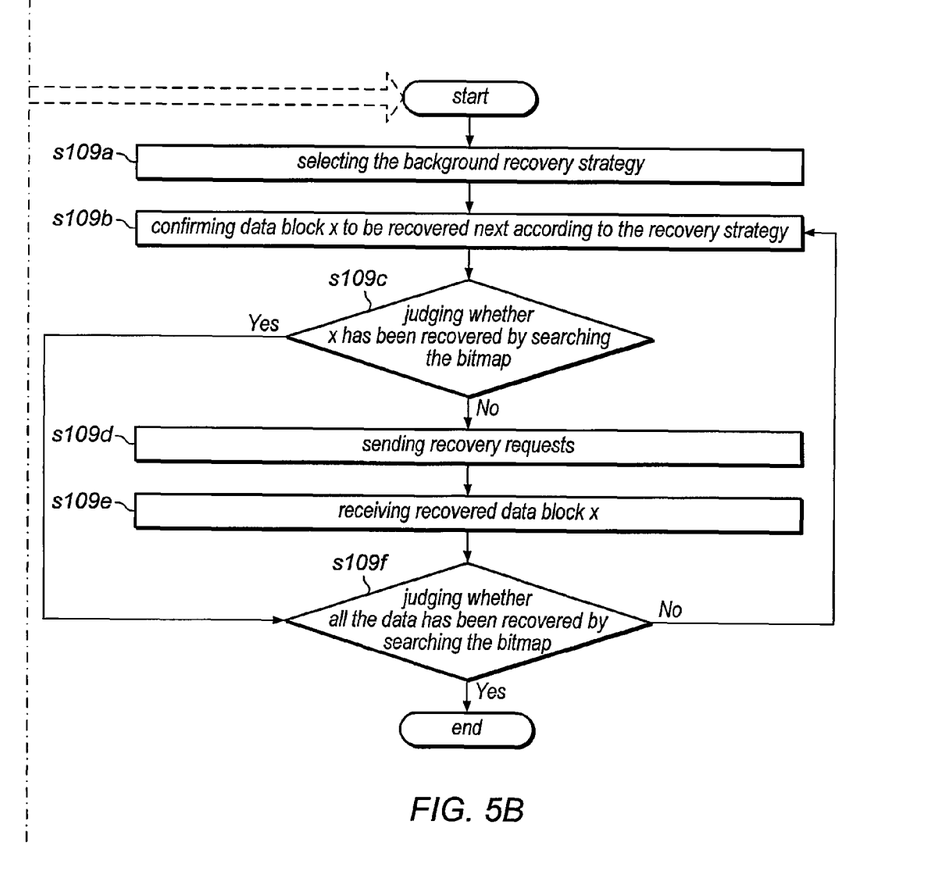

The example gives a flow chart of the virtual machine-based on-demand parallel disaster recovery method. The method thereof mainly includes:

s100, client 1 and disaster recovery center 2 are initiated; and the concrete processes thereof are to load the said unit modules in client 1 and disaster recovery center 2 and to build a virtual machine environment in client 1;

s101, client 1 receives the backup request users initiate through backup sub-process 251, generates a backup task, establishes a connection with disaster recovery center 2. In the above-mentioned step, the method of generating the backup task by backup sub-process 251 is as follows: starting multiple backup applications initiated by users which can be multiple; each of the backup application corresponds with a backup request. The type of backup, the size of to-be-backup file system or volume object and backup data block are designated by the set parameters. Backup sub-process 251 sends backup requests to the monitoring port of request forward guard process 25 and then builds a backup task.

s102, disaster recovery service guard process 01 of disaster recovery center 2 receives the backup requests forwarded by client 1 through the monitoring port and informs backup data management unit 02 after analyzing the backup requests;

s103, backup data management unit 02 generates the corresponding memory image volumes and data image volumes in the virtual machine environment of client 1 according to the backup requests and stores the two kinds of volumes in a sharing storage pool in the form of logic volume to complete backup;

s104, client 1 starts the recovery process, which mainly includes the following steps: (1) setting recovery parameters and issuing recover requests to the monitoring port of request forward guard process 25; and (2) informing kernel interception unit 22 of initiating the recovery data bitmap and of sharing the bitmap through the memory image for read and changed by recovery sub-process 252 of request forward guard process 25; the recovery sub-process 252 receives the recover requests initiated by users and generates recovery tasks, establishes a connection with disaster recovery center 2 and forwards the subsequent requests of the recovery tasks to disaster recovery center 2. In steps of the method of generating recovery tasks by backup sub-process 251 are as follows: starting recovery applications according to the need of users; the recovery applications therein can be multiple which are initiated by users; each recovery application corresponds with a recover request; the set parameters indicate the time point of recovering, to-be-recovered memory image and file system image and the size of data blocks and so on; and a recovery task can be built by the recovery sub-process by sending recover requests to the monitoring port of the request forward guard process.

s105, disaster recovery service guard process 01 of the disaster recovery center 2 receives the recover requests through the monitoring port.

s106, index file management unit 03 searches and locates the memory image volumes of the virtual machine environment at the designated time point according to the recover requests. Disaster recovery service guard process 01 sends the memory image volumes to client 1.

s107, recovery sub-process 252 of client 1 receives memory image volumes and captures the memory image of the virtual machine environment at the designated time point. The memory image includes the stricture of process tree, the image of virtual space of each process and the loading points of file systems and so on;

s108, client 1 rebuilds the memory image according to captured memory image and recovers the normal running state of the virtual machine environment at the designated time point, and executes step s109 and s109' simultaneously;

s109, starting the function of read-write request intercepting of the kernel generic block device in the client, that is to start the function of kernel interception unit 22. When processes in the virtual machine environment visit the file system which can be applications in client 1 or database, the recovery data bitmap is searched firstly. If the data that is being requested has been recovered by reading through the recovery sub-process from the disaster recovery center, the file system is visited directly, otherwise step s110 is executed;

s110, client 1 initiates the operation of freezing of the virtual machine environment at the kernel state to make each process that belongs to the virtual machine enter into the state of freezing. At the state of freezing, the processes will not be scheduled. Then client 1 issues the recover requests of the requested data to the monitoring port of the request forward guard process;

s111, after receiving the data block recover request, the request forward guard process mounts the request in the queue of data block recover requests of the recovery task established in step s104 and endows the request with the highest priority and the callback function used to unfreeze the virtual machine. At the same time, the recovery sub-process finds the data blocks related to the lost data to some extent according to the corresponding prefetching strategy, generates the corresponding request and endows it with higher priority than other recover requests, and then sends the requests according to the priority and waits for the responses from the servers;

s112, after receiving the to-be-recovered data blocks from the servers, the recovery sub-process renews the recovery data bitmap first, signs the data blocks with "recovered" and writes the data blocks into the local storage media;

s113, initiating the operation of unfreezing the virtual machine to make the processes in the virtual machine environment resume operation;

after step s113, judging whether all the data have been recovered or not through searching the bitmap; if recovered, closing the kernel intercept module, releasing the bitmap and recovering normal reading and writing; otherwise, returning step s109 to recover.

s109', the recovery task established in step s1 04 sends continuously data block recover requests to the recovery sub-process in the background according to preset strategy (defaulted strategy is in sequence), and the following principles: (1) if it is known that the data block has been signed as "recovered" through searching the recovery data bitmap, skipping the block and trying to send the next recovery data block designated through the strategy; (2) the background recover request tries not to bother the data block recover requests sent by the kernel intercept module but to finish its work by setting the priority. In the example, s109' includes:

s109a, selecting the background recovery strategy;

s109b, confirming the next to-be-recovered data block x according to the recovery strategy;

s109c, judging whether data block x has been recovered or not through searching the bitmap; if recovered, executing step s109f; otherwise, executing step s109d;

s109d, sending the recover request that requests to the recovery sub-process for capturing data block x, then recovery sub-process arranges it in the recovery queue, establishes a connection with the disaster recovery terminal, and then sends the recover request to the disaster recovery center; and then the data block x backup is searched and then sent to the client by the disaster recovery center through the recover request;

s109e, after receiving data block x, the recovery sub-process of the client renews the bitmap, and writes them into the local storage media;

s109f, judging whether all the data has been recovered or not through searching the bitmap; if recovered, the circle ends; otherwise, executing step s109b.

Both the recovery procedure starting from step s109 and the background recovery procedure equaling step s109' in the method conduct the recovery task of recovering the data blocks after rebuilding the memory image, between which the difference is the different priority. The recovery procedure executed by step s109 is to recover the to-be-visited data during recovery for the users' needs of inviting the data in time. If there is no data block recover request from the kernel intercept module, the recovery procedure executed by step s109 conducts the recovery of the data blocks in background according to the recovery strategy.

It specifically includes the steps as follows that the step of rebuilding memory image and recovering the normal running state of the virtual machine at the designated time point by the client in step s108 of the example:

s108a, deriving a kernel process root_task to indicate it is ancestor, modifying the kernel stack of kernel process root-_task to make it is switched to a defaulted self-recovering process when the system call withdraws; the kernel process derives its sub-processes, modifies its kernel stack again, and copies the stack of the user state and virtual image of the root process of the operation system in client from the memory image, builds the withdraw of the second system call and switches to the root process of the user state at the designated time point;

s108b, the sub-processes derived by the said self-recovering process are still self-recovering processes which will not derive new sub-processes in sequence from root to leaves according to the structure of the process tree in the memory image until all the processes in the memory image are derived, then set all the processes as deep-sleep state;

s108c, starting an independent process in the client outside the virtual machine environment; according to the orders of users, the independent process resets the state of all the processes in the virtual machine environment according to the record in the memory image to recovery the normal running state of the virtual machine environment.

In the example, the method of creating the virtual machine environment in client 1 includes:

s100a, extending the structure of the processes in the kernel of the operation system in client 1 to add the domain named vm_context_info to the structure, the domain named vm_context_info stands for the process context of the virtual machine where the processes are located. The process context includes ID of the virtual machine, the list of the processes in the environment, the devices and loading points corresponding to the root file system, and the statistical information of the data;

s100b, initiating the virtual environment, starting a process of user state root_thread, finishing the switching between input devices and output devices in terminals, and entering into the kernel state through system call and finishing the following work: initiating the scheduling mechanism of the process groups in the virtual machine; initiating pseudo-file system special for the virtual machine, that is conducting the second loading to a sub-tree of the local physical file system, and virtualizing new super nodes; and initiating the system call related to the virtual machine;

s100c, switching the said process to the user space, executing the executable code/sbin/init of the standard root process of the LINUX like operation system of the client in the context of the virtual machine to make the user state process root_thread become the root process of the virtual machine environment and then deriving related sub-processes to create related system services;

s100d, building the switching mechanism between the process context of the local operation system and that of the virtual machine and executing the applications that need to be protected by disaster recovery in the virtual machine environment, that is, conducting the said step s101 to s113.

The method of freezing the virtual machine in the example includes:

s113a, according to the to-be-protected applications, switching to the context of the virtual machine processes that the applications belong to, going through the list of processes in the environment, changing the location of freezing, and considering several special situations, such as the processes that "fork" has been just finished but "exec" has not been executed, the processes that has stopped executing for being traced; for the said situations, waiting for a moment and retry to freeze; for processes that have stopped, neglecting them;

s113b, waking up the processes belong to the virtual machine, sending a pseudo-signal to them to freeze them which will not be scheduled, and waiting for a moment until all the processes are at the state of freezing;

s113c, setting the memory barrier using the newest existing synchronization mechanism Read Copy Update, and waiting for the end of the data operation derived by each bottom IO or the network through the operation of synchronization.

When users need to provide multiple systems and applications with the protect of the disaster recovery at the same time, it is possible that there existing multiple backup tasks and recovery tasks in a node of client 1. In the example, backup sub-process 251 and recovery sub-process 252 endow different priority to the tasks of different importance, and schedule the tasks according to the priority. The principle of scheduling is: the task with higher priority has higher bandwidth, scheduling is conducted according to priority through data block requests containing more higher priority in each frame. In realization, the lost data blocks from the kernel interception unit are endowed with the highest priority; the data blocks related to the lost data blocks and prefetched according to the related strategy are endowed with higher priority, and the requests sent from the recovery tasks are endowed with lower priority; and the procedures of capturing and recovering are conducted in the background.

After sending the recover requests of the lost data to the request forward guard process 25, the kernel interception unit 22 of the client 1 prefetches by submitting the recover requests of each block close to the physical position of the lost data blocks. The physical position is determined by the set address offset threshold "offset" which is a parameter that needs to be dynamically tuned to the optimal value. The way of tuning is: when the prefetched data equal the files that the processes in the virtual machine environment need to visit, the absolute value of the said address offset threshold will be increased, otherwise the absolute value will be reduced.

The recovery task executes the recovery procedure according to the recovery strategy of background which is used to decide the order of recovering the data. The principle of the recovery strategy is: capturing the data blocks which are used frequently when running, and are read and written frequently; sending the sensitive data first to start the applications in the virtual machine environment, most data can be prepared in advance to make the possibility of the lost data blocks found by the kernel interception unit 22 as small as possible and thus to reduce the cost brought by freezing the virtual machine environment, capturing data and unfreezing. The way of realization of the example is: setting sensibility of all data blocks whose transmitting sequence is decided by the sensibility; when the sensibility runs normally through applications, it is obtained through counting the time of reading and writing of each data block in a time window having a fixed size. The value of the sensibility is related to the detailed applications and time point; and its formula is as follows:

$$S_w = Count_w * (1-\alpha) + S_{w-1} * \alpha$$

Wherein, $S_w$ stands for the current sensibility; $S_{w-1}$ stands for the sensibility of the previous time window; $Count_w$ is the count of reading and writing of the current window; $\alpha$ is history factor used to reflect the relation between historic sensibility and the current sensibility; the data structure related to the sensibility is sensibility array and read-write count bitmap, both of which are reserved in the virtual machine environment where applications located. The sensibility needs to be re-counted; the array needs to be renewed; the bitmap needs to be cleared; and the count starts again at w interval. When backupping, as part of the memory image, the sensibility array will be backup in the said disaster recovery center 2.

During realization of the system in the example, the following issues have been dealt with: (1) the processing method when there is something wrong happening in client 1 is: during backup and recovery, when there are check error and unexpected interruption happening in the connection of applications, in the request forward guard process, and in the interface "Socket" of the disaster recovery service guard process of the service center, the methods of error retransmission and releasing the interface are used; (2) the way of compressing the bitmap: the bitmap of the data image with large capacity consumes lots of memory resources, so selecting a way of compressing, such as Run Length Code, to compress the bitmap according to the features of the bitmap since most of the continuous data blocks are renewed successively and continuous '1' and '0' are the majority in the bitmap; (3) the way of accessing the bitmap simultaneously is: because the bitmap may be visited simultaneously by the kernel interception module and request forward guard process, read-write lock RCU (rwlock) mechanism in the Linux 2.6 kernel is used to ensure the consistency and to improve the parallelizability; and it does not cover the original old data in disc temporarily, but opens a new space in memory to store the renewed data at the same time of renewing data by writing in order to store simultaneously the new data and the old data temporarily; at that time, all the reinitiated operation of reading and writing is located to the new space while the operation of reading can still visit the old data in disc; (4) for the recover request, rapid searching mechanism needs to be established in client to locate the related data stricture for the recover request when the recovery data is replied, so each recover request is not only linked in a two-way link list but also pushed into a hash bucket of a hash table according to its request number; (5) the way of ensuring the atomicity of renewing the recovery data bitmap and updating the disc data: when the recovery sub-process receives data, it writes the data into the bitmap, and then informs the subsequent processes that data has been received in order to avoid generating extra cost brought by freezing the virtual machine resulted in that applications find the corresponding bit in the bitmap is '0'; at the same time, the setting of the bitmap plays a role of REDO log, that is, if the received data failed to be written, it will not be reserved or rewritten until the data is written successfully and the submission of the task is completed.

All varieties of the local host of the client can run any services firstly; also, it can build the context of processes of the virtual machine and make a package of the to-be-protected applications through the environment and intercept consistent memory image without affecting the running of applications; finally, what is needed to do is to buy a third-party security disaster recovery memory card but no change needs to be conducted to the original operation system in order to integrate the context of processes of the virtual machine in the host of the client.

Although the present invention has been described herein with reference to particular exemplary embodiments, certain alterations and modifications may be apparent to those skilled in the art, without departing from the scope of the invention, which should be fallen into the protection scope of the present invention.

What is claimed is:

1. A virtual machine-based on-demand parallel disaster recovery system comprises a disaster recovery center and a client connected to each other; the disaster recovery center is made of multiple servers to compose a storage sharing cluster, the disaster recovery center comprises:
    a disaster recovery service guard unit which used to monitor ports and to receive backup or recover requests from the client and correspondingly to backup or recover data;
    a backup data management unit used to generate and store corresponding memory image volumes and data image volumes in response to backup requests from the client;
    a cluster volume management unit which virtualizes a sharing storage pool for all nodes to use and stores and manages memory image volumes and data image volumes in a storage pool in form of logic volume; and
    an index file management unit used to search and locate the memory image volumes and data image volumes in the storage pool;
the client comprises:
    a virtual machine environment building unit used to build an independent process group and sessions in a host system of the client and to encapsulate applications and corresponding resources protected by users and then to build the virtual machine environment where processes of the client are located;
    a kernel interception unit used to monitor each read-write request in the virtual machine environment and to search and maintain a recovery data bitmap that records the information related to the recovered data;
    a virtual machine freezing unit used to search the recovery data bitmap when the kernel interception unit has monitored that there is read-write request of processes of the virtual machine environment; if the data to be read and written is not recovered, an operation of freezing the virtual machine environment is initiated in core state;
    a virtual machine unfreezing unit used to initiate an operation of unfreezing the virtual machine after the data to be read and written is written into a local storage media in the client in order to make each process in the virtual machine environment resume operation; and
    a request forward guard unit used to communicate with the disaster recovery center, to initiate backup or recover request, sending and receiving data and to centrally manage data request and schedule to realize the disaster recovery.

2. The virtual machine-based on-demand parallel disaster recovery system according to claim 1, wherein the request forward guard unit in the client of the system comprises a backup subunit and a recovery subunit, wherein:
    the backup subunit is used to receive backup requests sent from users, to generate backup tasks, to establish a connection with the disaster recovery center according to a need of backup tasks, to forward the subsequent requests of the backup task to the servers and to centrally schedule the backup requests and control flow of them according to a priority of each backup task; and
    the recovery subunit is used to receive the recover requests sent from users and the kernel interception unit, to generate recovery tasks, to establish a connection with the disaster recovery center according to a need of the recovery tasks, to record the data sent from disaster recovery center and write the data into the local storage media, to execute callback function to complete data recovery in response to the recover requests from the kernel interception unit simultaneously, and to centrally schedule the recover requests and control flow of them according to the priority of each recovery task.

3. The virtual machine-based on-demand parallel disaster recovery system according to claim 1, wherein the disaster recovery center in the system further comprises a cluster volume guard unit communicating with the cluster volume management unit, the cluster volume guard unit is used to maintain the state of the sharing storage cluster and to ensure a number of effective nodes in the sharing cluster and synchronization of a modification made to the memory image volumes and data image volumes in the storage pool.

4. The virtual machine-based on-demand parallel disaster recovery system according to claim 1, wherein the disaster recovery center in the system further comprises a cluster volume drive unit and a physical device drive unit, the cluster volume drive unit is used to maintain the mapping information of logic data blocks and physical data blocks of the memory image volumes and data image volumes and to schedule and distribute read-write orders of each logic volume, a layer under the cluster volume drive unit is a physical device drive unit connecting to the sharing storage pool through a storage area network.

5. A method of virtual machine-based on-demand parallel disaster recovery utilizing the said system according to claim 1, the method comprising:
    s1.0, creating the virtual machine environment in the client and containing the protected applications in the virtual machine environment;
    s1.1, generating the memory image volumes and data image volumes of the virtual machine environment at a designated time point according to the backup request of the client and completing the backup of data;
    s1.2, the client initiates the recovery procedure, it generates recovery tasks according to recover requests that users initiate and sends recover requests to the disaster recovery center, and simultaneously informs the kernel interception unit of initializing the recovery data bitmap;
    s1.3, the disaster recovery center searches and locates the memory image volumes of the virtual machine environment at the designated time point according to the recover request and sends the memory image volumes to the client;
    s1.4, the client captures the memory image of the virtual machine environment at the designated time point according to the received memory image volumes, then rebuilds the memory image to recover a normal running state of the virtual machine environment at the designated time point, and executes step s1.5 and step s1.5' simultaneously;
    s1.5, opening an intercepting function of read-write request of the kernel generic block device in the client; searching the recovery data bitmap firstly when processes in the virtual machine environment visit a file system; if data to be read and written have been recovered, visiting the file system directly, otherwise executing step s1.6;

s1.6, the client initiates the operation of freezing the virtual machine environment; the kernel interception unit issues the recover requests of the read-write data;

s1.7, hanging the recover requests in step s1.6 in an array of the recovery tasks built in step s1.2 and endowing the recover requests with a highest priority and then waiting for the responses from the disaster recovery center;

s1.8, after receiving the read-write data from the disaster recovery center, the client renews the recovery data bitmap by marking the read-write data as "recovered" and then writes the marked data into the local storage media;

s1.9, unfreezing the virtual machine to make the processes in the virtual machine environment resume operation; and s1.5', according to the recovery task established in step s1.2, the client continuously sends data block recover requests to the disaster recovery center for the recovery of data blocks in a background; during recovering, avoiding to repeat recovering data through searching the recovery data bitmap.

6. The virtual machine-based on-demand parallel disaster recovery method according to claim 5, wherein rebuilding the memory image to recover the normal running state of the virtual machine environment at the designated time point conducted in step s1.4 of the method comprises:

s1.4a, deriving a kernel process according to a process tree in the memory image, modifying a kernel stack of the kernel process to switch the kernel process to default self-recovering processes when a system call withdraws;

s1.4b, the kernel process derives their sub-processes according to the process tree in the memory image; the said sub-processes are self-recovering processes; modifying the kernel stack again to construct a withdrawing of the second system call and then switching the kernel processes to a root process of user state at the designated time point;

s1.4c, deriving new sub-processes in sequence from root to leaves according to a structure of the process tree in the memory image until all the processes in the memory image are derived; and then setting the state of each derived process as deep-sleep state; and s1.4d, starting another independent process located outside the virtual machine environment in the client; according to orders of users, an independent process resets the states of all the processes in the virtual machine environment in accordance with the records in the memory image to recover the normal running state of the virtual machine environment at the designated time point.

7. The virtual machine-based on-demand parallel disaster recovery method according to claim 5, wherein step s1.0 of building the virtual machine environment in the method comprises:

s1.0a, extending a structure of the processes in the kernel of operation system in the client to make the structure be added with a domain standing for a context of the processes of virtual machine located by the processes;

s1.0b, starting a process of user state to complete a switch between input device and output device and then entering into a kernel state through a system call;

s1.0c, switching the said processes of user states to a user space and executing/sbin/init in the context of the virtual machine to make the processes of user states become the a root process of the virtual machine environment, deriving related sub-processes and then building related system services; and s1.0d, building the switching mechanism between the context of processes in a local operation system and that of processes of the virtual machine to build the virtual machine environment.

8. The virtual machine-based on-demand parallel disaster recovery method according to claim 5, wherein after issuing the recover request of read-write data in step s1.6, selecting prefetched data to prefetch by way of submitting the recover request of each data block close to a physical position of the read-write data, wherein, the physical position is determined by an address offset threshold.

9. The virtual machine-based on-demand parallel disaster recovery method according to claim 8, wherein the said address offset threshold is a dynamically optimal value-tuning parameter, a way of tuning is: when the prefetched data is what the files, which the processes in the virtual machine environment need to visit, need, an absolute value of the said address offset threshold is increased, otherwise it is reduced.

10. The virtual machine-based on-demand parallel disaster recovery method according to claim 8, wherein the priority of the recover request of the prefetched data is lower than that of the read-write data in step s1.6, but higher than that of data blocks sent by the background in step s1.5'.

11. The virtual machine-based on-demand parallel disaster recovery method according to claim 5, wherein in step s1.5', according to a preset recovery strategy, the background continuously sends the recover requests of data blocks to the disaster recovery center to recover data blocks, the said recovery strategy is: sending the recover requests of data blocks in sequence of a sensitivity level and sending data blocks with high sensitivity level first, the said sensitivity level is set in data blocks, the said sensitivity level is obtained through counting a time of reading and writing of each data block in time window w with a fixed size.

12. The virtual machine-based on-demand parallel disaster recovery method according to claim 5, wherein step s1.8 further comprises compressing the bitmap by a way of tour code after renewing the bitmap.

13. The virtual machine-based on-demand parallel disaster recovery method according to claim 5, wherein in step s1.8, read-write lock mechanism is selected when renewing bitmap, old data is not deleted when renewing data by the operation of writing until all the read-visits conducted by the old data end, during the process, the operation of reading that newly occurs is located to new data.

14. The virtual machine-based on-demand parallel disaster recovery method according to claim 5, wherein in step s1.2, the client turns each recover request to a two-way link list through link of points, then builds a recover request hash list in memory and puts each recover request into each hash bucket according to its request number.

15. The virtual machine-based on-demand parallel disaster recovery method according to claim 5, wherein in step s1.8 and s1.5, after receiving the recovered data from the disaster recovery center, the client writes the data into the bitmap first and then informs subsequent procedures that the data has been received, if the data fails to be written, the received data will not be reserved and not be rewritten until the data is written successfully.

* * * * *